United States Patent
Colligan et al.

(10) Patent No.: US 8,688,083 B2
(45) Date of Patent: Apr. 1, 2014

(54) SYSTEM AND METHOD FOR PROVIDING ADVERTISEMENT DATA OR OTHER CONTENT

(75) Inventors: Edward T. Colligan, San Jose, CA (US); David Vadasz, Los Altos, CA (US); Bernard P. Cousineau, Burlingame, CA (US); David D. Daetz, Cupertino, CA (US); Matias G. Duarte, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 938 days.

(21) Appl. No.: 12/324,678

(22) Filed: Nov. 26, 2008

(65) Prior Publication Data
US 2010/0130179 A1    May 27, 2010

(51) Int. Cl.
H04M 3/42      (2006.01)
H04L 29/06     (2006.01)
H04W 68/00     (2009.01)
H04L 29/08     (2006.01)

(52) U.S. Cl.
CPC .................... H04L 29/08108 (2013.01)
USPC ............. 455/414.1; 455/414.3; 455/456.3; 370/328; 705/14.73; 705/16; 705/67; 705/319; 463/13; 463/27

(58) Field of Classification Search
USPC ............. 455/414.1, 414.3, 456.3; 370/328; 705/1.1, 14.73, 67, 319; 463/27, 13
See application file for complete search history.

(56) References Cited

U.S. PATENT DOCUMENTS

| | | | |
|---|---|---|---|
| 4,779,081 A | 10/1988 | Nakayama et al. |
| 4,788,675 A | 11/1988 | Jones et al. |
| 5,134,719 A | 7/1992 | Mankovitz |
| 5,303,393 A | 4/1994 | Noreen et al. |
| 6,000,000 A | 12/1999 | Hawkins et al. |
| 6,009,409 A | 12/1999 | Adler et al. |
| 6,011,976 A | 1/2000 | Michaels et al. |
| 6,073,075 A | 6/2000 | Kondou et al. |
| 6,108,727 A | 8/2000 | Boals et al. |
| 6,141,010 A | 10/2000 | Hoyle |
| 6,157,814 A | 12/2000 | Hymel et al. |
| 6,182,010 B1 | 1/2001 | Berstis |

(Continued)

FOREIGN PATENT DOCUMENTS

| EP | 1220552 A1 | 7/2002 |
|---|---|---|
| EP | 1551193 A1 | 7/2005 |

(Continued)

OTHER PUBLICATIONS

International Search Report and Written Opinion for International Application No. PCT/US2009/064940, mail date May 13, 2010, 8 pages.

(Continued)

*Primary Examiner* — William D Cumming
(74) *Attorney, Agent, or Firm* — Kilpatrick Townsend & Stockton LLP

(57) ABSTRACT

A method includes providing advertisement data to a mobile device, receiving an input associated with the mobile device based on the advertisement data, and providing a credit based on the input. The input may be based on at least one of a location of the mobile device, a messaging communication initiated using the mobile device, an entry in an information management application, and a transaction executed using the mobile device.

24 Claims, 3 Drawing Sheets

(56) References Cited

U.S. PATENT DOCUMENTS

| | | | |
|---|---|---|---|
| 6,216,112 B1 | 4/2001 | Fuller et al. | |
| 6,253,326 B1 | 6/2001 | Lincke et al. | |
| 6,259,405 B1 | 7/2001 | Stewart et al. | |
| 6,300,946 B1 | 10/2001 | Lincke et al. | |
| 6,343,317 B1 | 1/2002 | Glorikian | |
| 6,343,318 B1 | 1/2002 | Hawkins et al. | |
| 6,359,571 B1 | 3/2002 | Endo et al. | |
| 6,360,272 B1 | 3/2002 | Lincke et al. | |
| 6,397,246 B1 | 5/2002 | Wolfe | |
| 6,397,259 B1 | 5/2002 | Lincke et al. | |
| 6,425,087 B1 | 7/2002 | Osborn et al. | |
| 6,430,603 B2 | 8/2002 | Hunter | |
| 6,452,498 B2 | 9/2002 | Stewart | |
| 6,453,371 B1 | 9/2002 | Hampson et al. | |
| 6,456,234 B1 | 9/2002 | Johnson | |
| 6,457,134 B1 | 9/2002 | Lemke et al. | |
| 6,484,033 B2 | 11/2002 | Murray | |
| 6,493,327 B1* | 12/2002 | Fingerhut | 370/328 |
| 6,505,046 B1* | 1/2003 | Baker | 455/456.3 |
| 6,523,124 B1 | 2/2003 | Lunsford et al. | |
| 6,526,268 B1 | 2/2003 | Marrah et al. | |
| 6,529,159 B1 | 3/2003 | Fan et al. | |
| 6,545,596 B1 | 4/2003 | Moon | |
| 6,546,257 B1 | 4/2003 | Stewart | |
| 6,560,640 B2 | 5/2003 | Smethers | |
| 6,571,279 B1 | 5/2003 | Herz et al. | |
| 6,581,025 B2 | 6/2003 | Lehman | |
| 6,590,588 B2 | 7/2003 | Lincke et al. | |
| 6,591,288 B1 | 7/2003 | Edwards et al. | |
| 6,628,928 B1 | 9/2003 | Crosby et al. | |
| 6,647,257 B2 | 11/2003 | Owensby | |
| 6,647,269 B2* | 11/2003 | Hendrey et al. | 455/456.3 |
| 6,650,902 B1 | 11/2003 | Richton | |
| 6,675,165 B1 | 1/2004 | Rothschild | |
| 6,675,202 B1 | 1/2004 | Perttunen | |
| 6,675,204 B2 | 1/2004 | De Boor et al. | |
| 6,694,428 B2 | 2/2004 | Lemke et al. | |
| 6,701,521 B1 | 3/2004 | McLlroy et al. | |
| 6,719,629 B2* | 4/2004 | Yang | 463/13 |
| 6,782,253 B1 | 8/2004 | Shteyn et al. | |
| 6,795,710 B1 | 9/2004 | Creemer | |
| 6,816,725 B1 | 11/2004 | Lemke et al. | |
| 6,829,560 B2 | 12/2004 | Lehman | |
| 6,847,969 B1 | 1/2005 | Mathai et al. | |
| 6,880,048 B1 | 4/2005 | Lemke | |
| 6,922,567 B1 | 7/2005 | Rydbeck | |
| 6,944,443 B2 | 9/2005 | Bates et al. | |
| 6,947,976 B1 | 9/2005 | Devitt et al. | |
| 6,961,567 B1 | 11/2005 | Kuhn | |
| 7,024,464 B1 | 4/2006 | Lusher et al. | |
| 7,089,264 B1 | 8/2006 | Guido et al. | |
| 7,103,370 B1 | 9/2006 | Creemer | |
| 7,266,379 B2 | 9/2007 | Blight et al. | |
| 7,343,564 B2 | 3/2008 | Othmer | |
| 7,360,248 B1 | 4/2008 | Kanevsky et al. | |
| 7,376,414 B2* | 5/2008 | Engstrom | 455/414.3 |
| 7,424,447 B2 | 9/2008 | Fuzell-Casey et al. | |
| 7,505,920 B2* | 3/2009 | Agarwal et al. | 705/14.73 |
| 7,536,190 B1 | 5/2009 | Creemer | |
| 7,562,051 B1* | 7/2009 | Donner | 705/67 |
| 7,565,328 B1* | 7/2009 | Donner | 705/67 |
| 7,577,620 B1* | 8/2009 | Donner | 705/67 |
| 7,788,188 B2* | 8/2010 | Kramer | 705/319 |
| 7,856,360 B2* | 12/2010 | Kramer et al. | 705/1.1 |
| 7,873,372 B2 | 1/2011 | Creemer | |
| 7,972,209 B2* | 7/2011 | Kelly et al. | 463/27 |
| 8,023,929 B2* | 9/2011 | Mgrdechian et al. | 455/414.1 |
| 8,195,106 B2* | 6/2012 | Jung et al. | 455/126 |
| 2001/0032121 A1 | 10/2001 | Le | |
| 2001/0044310 A1 | 11/2001 | Lincke | |
| 2001/0047272 A1 | 11/2001 | Frietas et al. | |
| 2002/0052781 A1 | 5/2002 | Aufricht et al. | |
| 2002/0069093 A1 | 6/2002 | Stanfield | |
| 2002/0077084 A1 | 6/2002 | Zellner et al. | |
| 2002/0077118 A1 | 6/2002 | Zellner et al. | |
| 2002/0087401 A1 | 7/2002 | Leapman et al. | |
| 2002/0103693 A1 | 8/2002 | Bayer et al. | |
| 2002/0121989 A1 | 9/2002 | Burns | |
| 2002/0137530 A1 | 9/2002 | Karve | |
| 2003/0008661 A1 | 1/2003 | Joyce et al. | |
| 2003/0050046 A1 | 3/2003 | Conneely et al. | |
| 2003/0060211 A1 | 3/2003 | Chern et al. | |
| 2003/0060214 A1 | 3/2003 | Hendrey et al. | |
| 2003/0159109 A1 | 8/2003 | Rossmann et al. | |
| 2003/0186722 A1 | 10/2003 | Weiner | |
| 2004/0061723 A1 | 4/2004 | Tai et al. | |
| 2004/0203643 A1 | 10/2004 | Bhogal et al. | |
| 2005/0096982 A1 | 5/2005 | Morton et al. | |
| 2005/0102329 A1 | 5/2005 | Jiang et al. | |
| 2005/0245241 A1 | 11/2005 | Durand et al. | |
| 2006/0030306 A1 | 2/2006 | Kuhn | |
| 2006/0036490 A1 | 2/2006 | Sagalyn | |
| 2006/0041472 A1 | 2/2006 | Lukose et al. | |
| 2006/0143083 A1 | 6/2006 | Wedeen | |
| 2006/0156209 A1 | 7/2006 | Matsuura et al. | |
| 2006/0197781 A1 | 9/2006 | Arutunian | |
| 2006/0200308 A1 | 9/2006 | Arutunian | |
| 2006/0200311 A1 | 9/2006 | Arutunian et al. | |
| 2006/0200382 A1 | 9/2006 | Arutunian et al. | |
| 2006/0200383 A1 | 9/2006 | Arutunian et al. | |
| 2006/0200384 A1 | 9/2006 | Arutunian et al. | |
| 2007/0021108 A1 | 1/2007 | Bocking et al. | |
| 2007/0111711 A1 | 5/2007 | Ratnakar | |
| 2007/0149256 A1 | 6/2007 | Burgan et al. | |
| 2007/0150825 A1 | 6/2007 | Jachner | |
| 2007/0178899 A1 | 8/2007 | Kuhn | |
| 2007/0198698 A1 | 8/2007 | Boyd et al. | |
| 2007/0263863 A1 | 11/2007 | Sakhpara | |
| 2007/0271234 A1 | 11/2007 | Ravikiran | |
| 2008/0032666 A1 | 2/2008 | Hughes et al. | |
| 2008/0052413 A1 | 2/2008 | Wang et al. | |
| 2008/0059285 A1 | 3/2008 | Hamoui | |
| 2008/0132219 A1 | 6/2008 | Bisdikian et al. | |
| 2008/0132252 A1 | 6/2008 | Altman et al. | |
| 2008/0160966 A1 | 7/2008 | Mckiou et al. | |
| 2008/0195457 A1 | 8/2008 | Sherman et al. | |
| 2008/0291022 A1 | 11/2008 | Amador et al. | |
| 2009/0006194 A1 | 1/2009 | Sridharan et al. | |
| 2009/0076906 A1 | 3/2009 | Kansal et al. | |
| 2009/0197619 A1 | 8/2009 | Colligan et al. | |
| 2011/0202412 A1* | 8/2011 | Mathew et al. | 705/16 |

FOREIGN PATENT DOCUMENTS

| | | |
|---|---|---|
| EP | 1 631 050 | 6/2007 |
| WO | WO 99/55066 A1 | 10/1999 |
| WO | WO 01/65411 A1 | 9/2001 |
| WO | WO 2006/099586 | 9/2006 |

OTHER PUBLICATIONS

Office Action for U.S. Appl. No. 09/794,082, mail date May 16, 2008, 10 pages.

Office Action for U.S. Appl. No. 09/794,082, mail date Jan. 14, 2009, 9 pages.

Office Action for U.S. Appl. No. 09/794,082, mail date Jun. 25, 2009, 8 pages.

Office Action for U.S. Appl. No. 12/420743, mail date May 7, 2010, 9 pages.

Advisory Action for U.S. Appl. No. 09/794,082, mail date Sep. 11, 2009, 4 pages.

Examiner's Answer to Appeal Brief for U.S. Appl. No. 09/794,082, mail date Mar. 24, 2010, 15 pages.

Office Action for U.S. Appl. No. 12/402,386, mail date Nov. 23, 2010, 21 pages.

Office Action for U.S. Appl. No. 12/422,871, mail date Dec. 15, 2010, 29 pages.

Office Action for U.S. Appl. No. 11/901,272, mail date Jan. 20, 2011, 12 pages.

Office Action for U.S. Appl. No. 12/324,694, mail date Jan. 24, 2011, 17 pages.

(56) References Cited

OTHER PUBLICATIONS

International Search Report and Written Opinion for International Application No. PCT/US2009/068525, mail date Aug. 5, 2010, 8 pages.
Office Action for U.S. Appl. No. 12/324,694, mail date Aug. 5, 2010, 10 pages.
Office Action for U.S. Appl. No. 11/901,272, mail date Aug. 10, 2010, 10 pages.
Office Action for U.S. Appl. No. 11/634,328, mail date Jun. 23, 2009; 8 pages.
U.S. Appl. No. 12/324,694, filed Nov. 26, 2008, Colligan et al.
U.S. Appl. No. 11/449,001, filed Jun. 6, 2006, Creemer.
U.S. Appl. No. 61/140,562, filed Dec. 23, 2008, Colligan et al.
U.S. Appl. No. 60/954,022, filed Aug. 6, 2007, Swift et al.
International Search Report for International Application No. PCT/US2001/06340; date mailed May 16, 2001; 1 page.
Office Action for U.S. Appl. No. 11/540,909, date mailed Nov. 17, 2008, 14 pages.
Office Action for U.S. Appl. No. 11/809,198, date mailed Oct. 24, 2008, 15 pages.
Protest for U.S. Appl. No. 09/794,082, filed Feb. 24, 2004, 5 pages.
Response to Office Action for U.S. Appl. No. 11/540,909, date mailed Apr. 16, 2009, 10 pages.
Response to Office Action for U.S. Appl. No. 11/809,198, date mailed Feb. 17, 2009, 11 pages.

\* cited by examiner

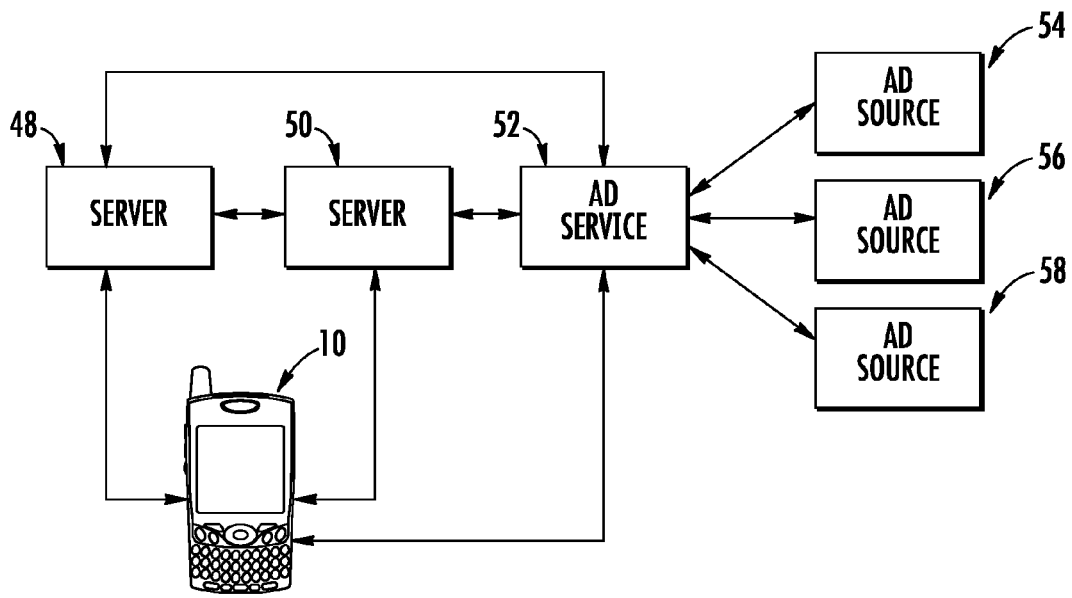
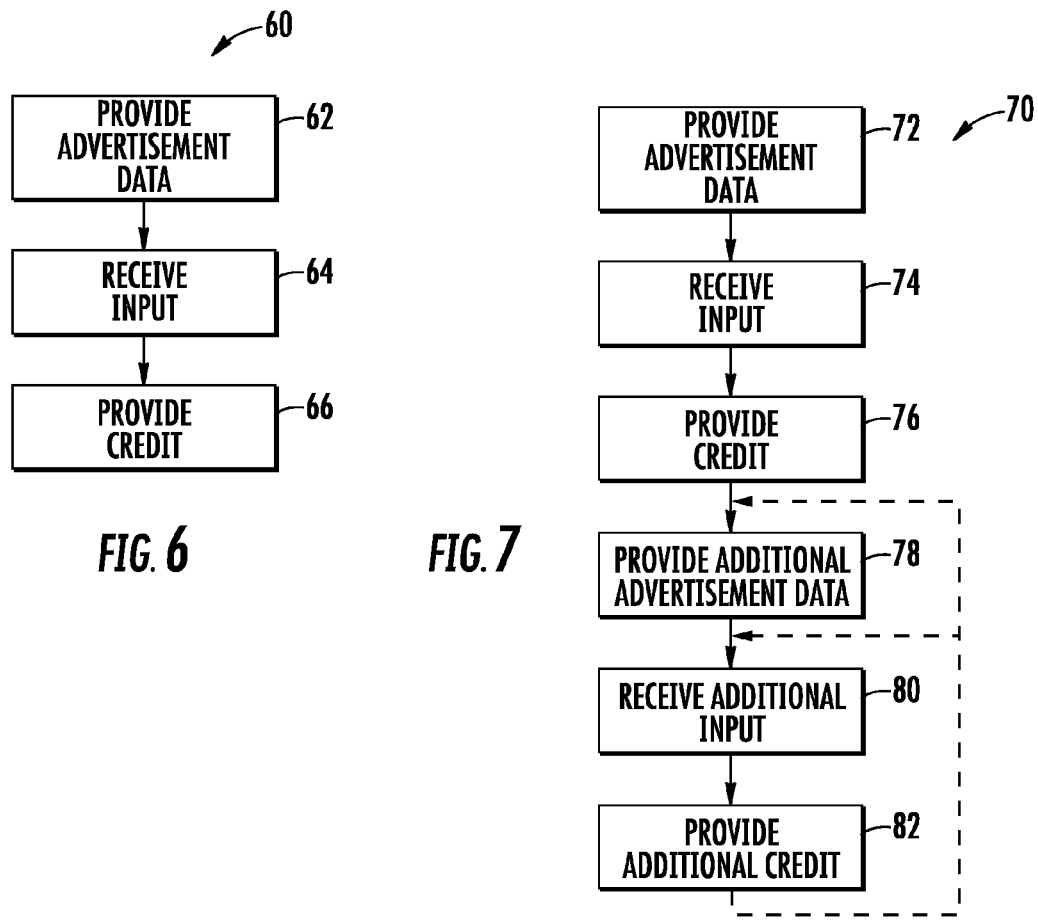

SYSTEM AND METHOD FOR PROVIDING ADVERTISEMENT DATA OR OTHER CONTENT

BACKGROUND

The present disclosure relates generally to the field of mobile computing devices, and more specifically, to systems and methods for providing advertisement data to a mobile computing device.

Mobile devices may be used to provide advertisement data or other content to users of mobile devices. For example, as a user travels, advertisements may be displayed on a mobile device the user is carrying based upon the geographic location of the mobile device or other factors. For example, if a user walks past a restaurant, an advertisement (e.g., coupon, discount, general advertisement, etc.) may be displayed on the user's mobile device.

However, with the increasing usage of mobile devices and location-based advertisements, users may receive numerous advertisements, where many may be irrelevant to the user, and where it may be difficult to identify relevant or useful advertisements because of the high number of advertisements being received.

BRIEF DESCRIPTION

FIG. 5 is a block diagram showing a system for providing advertisement data according to an exemplary embodiment.

FIG. 6 is a flowchart illustrating a method of providing advertisement data according to an exemplary embodiment.

FIG. 7 is a flowchart illustrating a method of providing advertisement data according to another exemplary embodiment.

DETAILED DESCRIPTION

Figure 3:
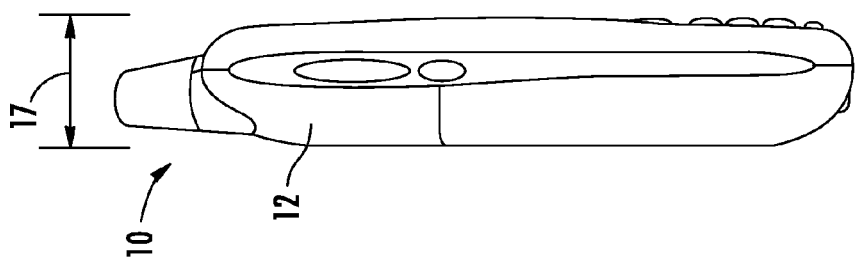
FIG. 3 is a side view of the mobile device of FIG. 1 according to an exemplary embodiment.
Figure 2:
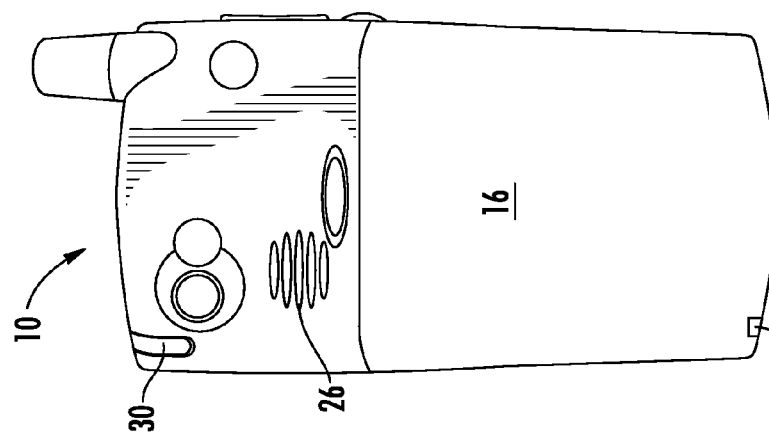
FIG. 2 is a back view of the mobile device of FIG. 1 according to an exemplary embodiment.
Figure 1:
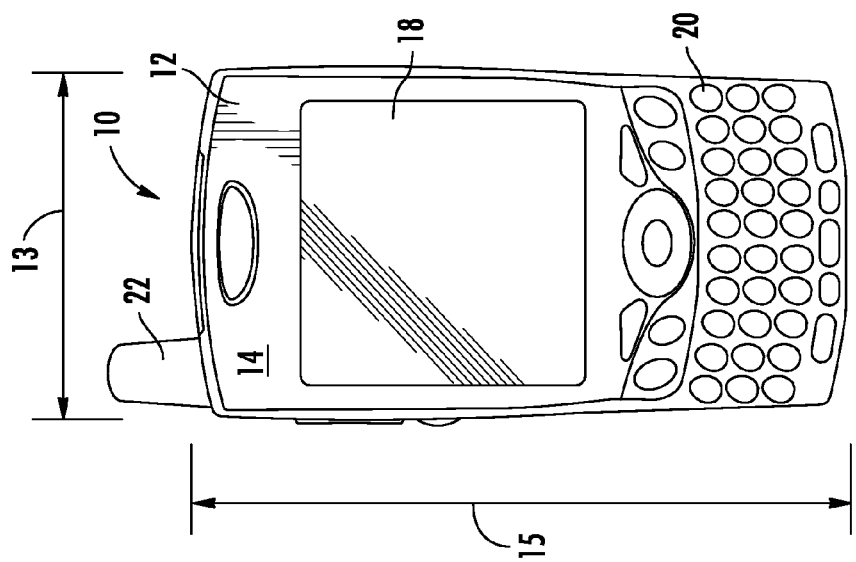
FIG. 1 is a front view of a mobile device according to an exemplary embodiment.

Referring to FIGS. 1-3, a mobile device 10 is shown. The teachings herein can be applied to device 10 or to other electronic devices (e.g., a desktop computer), mobile computing devices (e.g., a laptop computer) or handheld computing devices, such as a personal digital assistant (PDA), smartphone, mobile telephone, personal navigation device, etc. According to one embodiment, device 10 is a smartphone, which is a combination mobile telephone and handheld computer having PDA functionality. PDA functionality can comprise one or more of personal information management (e.g., including personal data applications such as email, calendar, phone, text messaging, etc.), database functions, word processing, spreadsheets, voice memo recording, Global Positioning System (GPS) functionality, etc. Device 10 is configured to synchronize personal information from these applications with a computer (e.g., a desktop, laptop, server, etc.). Device 10 is further configured to receive and operate additional applications provided to device 10 after manufacture, e.g., via wired or wireless download, SecureDigital card, etc.

As shown in FIGS. 1-3, device 10 includes a housing 12 and a front side 14 and a back side 16. Device 10 further comprises a display 18 and a user input device 20 (e.g., a QWERTY keyboard, buttons, touch screen, speech recognition engine, etc.). Display 18 can comprise a touch screen display in order to provide user input to a processor 40 (see FIG. 4) to control functions, such as to select options displayed on display 18, enter text input to device 10, or enter other types of input. Display 18 also provides images (see, e.g., FIG. 6) that are displayed and may be viewed by users of device 10. User input device 20 can provide similar inputs as those of touch screen display 18. Device 10 can further comprise a speaker 26, and a stylus 30 to assist the user in making selections on display 18.

According to various exemplary embodiments, housing 12 may be any size, shape, and have a variety of length, width, thickness, and volume dimensions. For example, width 13 may be no more than about 200 millimeters (mm), 100 mm, 85 mm, or 65 mm, or alternatively, width 13 may be at least about 30 mm, 50 mm, or 55 mm. Length 15 may be no more than about 200 mm, 150 mm, 135 mm, or 125 mm, or alternatively, length 15 may be at least about 70 mm or 100 mm. Thickness 17 may be no more than about 150 mm, 50 mm, 25 mm, or 15 mm, or alternatively, thickness 17 may be at least about 10 mm, 15 mm, or 50 mm. The volume of housing 12 may be no more than about 2500 cubic centimeters (cc) or 1500 cc, or alternatively, at least about 1000 cc or 600 cc.

According to an exemplary embodiment, housing 12 may be configured to hold a screen such as display 18 in a fixed relationship above a user input device such as user input device 20 in a substantially parallel or same plane. This fixed relationship excludes a hinged or movable relationship between the screen and the user input device (e.g., a plurality of keys) in the fixed embodiment. Display 18 may be a touch screen display and may comprise a capacitive touch screen, a mutual capacitance touch screen, a self capacitance touch screen, a resistive touch screen, a touch screen using cameras and light such as a surface multi-touch screen, proximity sensors, or other touch screen technologies. Display 18 may be configured to receive inputs from finger touches at a plurality of locations on display 18 at the same time. Display 18 may be configured to receive a finger swipe or other directional input, which may be interpreted by a processing circuit to control certain functions distinct from a single touch input.

Device 10 may be a handheld computer (e.g., a computer small enough to be carried in a typical front pocket found in a pair of pants, purse or other similar pocket), comprising such devices as typical mobile telephones and PDAs, but the term "handheld" and the phrase "configured to be held in a hand during use" excluding typical laptop computers and tablet personal computers ("PCs") for purposes of this disclosure. In alternative embodiments, the teachings herein may extend to laptop computers, tablet PCs, desktop PCs, and other electronic devices. The various input devices and other parts of device 100 as described below may be positioned anywhere on device 100 (e.g., the front side of FIG. 1, the rear side of FIG. 2, the side of FIG. 3, on a keyboard which is retractable to slide in and out from a portion of device 10 to be revealed along any of the sides of device 10, etc.).

Figure 4:
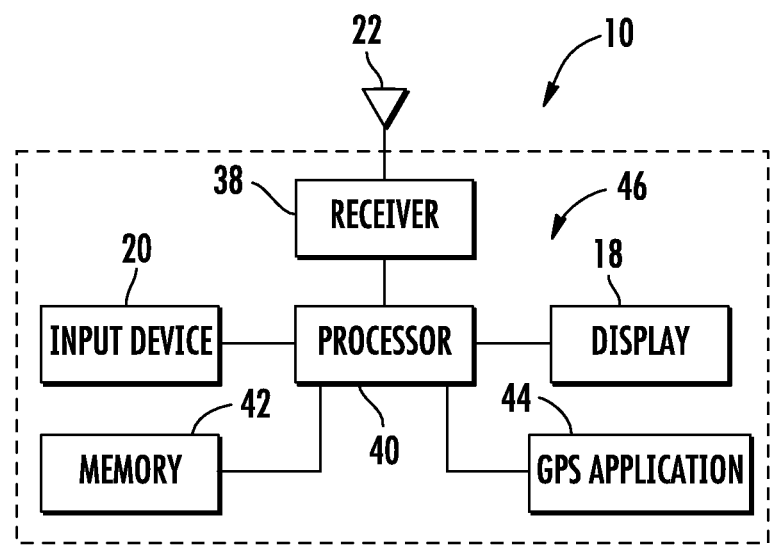
FIG. 4 is a block diagram of the mobile device of FIG. 1 according to an exemplary embodiment.

Referring now to FIG. 4, device 10 comprises a processing circuit 46 comprising a processor 40. Processor 40 can comprise one or more microprocessors, microcontrollers, and other analog and/or digital circuit components configured to perform the functions described herein. Processor 40 may comprise one or more memories (e.g., random access memory, read only memory, flash, etc.) configured to store software applications provided during manufacture or subsequent to manufacture by the user or by a distributor of device 10. In one embodiment, processor 40 can comprise a first applications microprocessor configured to run a variety of personal information management applications, such as email, a calendar, contacts, etc., and a second, radio processor on a separate chip or as part of a dual-core chip with the application processor. The radio processor is configured to operate telephony functionality. Device 10 can be configured for cellular radio telephone communication, such as Code Division Multiple Access (CDMA), Global System for Mobile Communications (GSM), Third Generation (3G) systems such as Wide-Band CDMA (WCDMA), or other cellular radio telephone technologies. Device 10 can further be configured for data communication functionality, for example, via GSM with General Packet Radio Service (GPRS) systems (GSM/GPRS), CDMA/1XRTT systems, Enhanced Data Rates for Global Evolution (EDGE) systems, Evolution Data Only or Evolution Data Optimized (EV-DO), and/or other data communication technologies.

Device 10 may also comprise a receiver 38 which comprises analog and/or digital electrical components configured to receive and transmit wireless signals via antenna 22 to provide cellular telephone and/or data communications with a fixed wireless access point, such as a cellular telephone tower, in conjunction with a network carrier, such as, Verizon Wireless, Sprint, etc. Device 10 can further comprise circuitry to provide communication over a local area network, such as Ethernet or according to an IEEE 802.11x standard or a personal area network, such as a Bluetooth or infrared communication technology. Device 10 may further comprise a memory 42 coupled to or as part of processor 40. Memory 42 may store a variety of information, data, applications, files, etc. that may be used or accessed using device 10.

Device 10 further comprises a microphone 36 (see FIG. 2) configured to receive audio signals, such as voice signals, from a user or other person in the vicinity of device 10, typically by way of spoken words. Alternatively or in addition, processor 40 can further be configured to provide video conferencing capabilities by displaying on display 18 video from a remote participant to a video conference, by providing a video camera on device 10 for providing images to the remote participant, by providing text messaging, two-way audio streaming in full- and/or half-duplex mode, etc.

Device 10 further comprises a location determining application, shown in FIG. 3 as GPS application 44. GPS application 44 can communicate with and provide the location of device 10 at any given time. Device 10 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

Device 10 may be arranged to operate in one or more location determination modes including, for example, a standalone mode, a mobile station (MS) assisted mode, and/or an MS-based mode. In a standalone mode, such as a standalone GPS mode, device 10 may be arranged to autonomously determine its location without real-time network interaction or support. When operating in an MS-assisted mode or an MS-based mode, however, device 10 may be arranged to communicate over a radio access network (e.g., UMTS radio access network) with a location determination entity such as a location proxy server (LPS) and/or a mobile positioning center (MPC).

Referring now to FIGS. 5-7, device 10 may be configured to receive and provide advertisement data or other content to users, and furthermore, to receive and/or provide credits (e.g., a monetary credit to a financial account, etc.) to accounts associated with one or more entities in conjunction with the advertisement data. "Providing" a credit may include, in various embodiments, calculating a credit, applying a credit to an account, transmitting a credit to an account on a server to be applied at the server, and so on. As shown in FIG. 5, device 10 may communicate with servers 48, 50, 52, which may in turn communicate with one or more advertisement sources 54, 56, 58 (e.g., ad sources such as retailers, restaurants, services, etc.). According to an exemplary embodiment, server 52 may be an advertisement service configured to provide advertisement data (e.g., visual advertisements, audible advertisements, e-coupons, etc.) from ad sources 54, 56, 58 to device 10 (either in coordination with, or independent from, servers 48, 50, as discussed in further detail below). Server 50 may be a server associated with an application developer that provides applications to be run on or provided to device 10, and server 48 may be a server associated with a manufacturer of device 10. In some embodiments, sources 54, 56, 58 may provide advertisement data to device 10 without utilizing servers 48, 50, 52 (e.g., such that the advertisement data is received by processor 40 of device 10 from sources 54, 56, 58).

Referring to FIG. 6, according to an exemplary embodiment, one or more credits may be generated and/or provided to accounts associated with and/or stored on one or more of servers 48, 50, 52, device 10, or other entities, as a result of providing advertisement data to device 10 and in response to one or more inputs (e.g., actions, notifications, indications, user inputs, automatically transmitted data, mobile device-specific inputs, etc.). As shown in FIG. 6, advertisement data is first provided to device 10 (step 62). An input is then received in response to the advertising data (step 64). In response to the input, a credit may be provided to one or more entities (e.g., to device 10 or to one or more of servers 48, 50, 52, etc.). Providing credits to various entities provides monetary incentives to various parties to view advertisements, provide well-targeted advertisements, etc.

According to various exemplary embodiments, the advertisement data may include a variety of information and be provided in a variety of ways. For example, advertisement data may be provided to a user of device 10 in the form of a visual image provided on display 18. For example, an icon may be displayed on device 10 and may be selected by a user to provide an enlarged advertisement such as an electronic coupon, etc. Alternatively, rather than providing a visual display, device 10 may provide an audible message (e.g., a recording of an advertisement, etc.). Furthermore, the advertisement data may be provided on display 18 and superimposed over another image, such as the current image the user is viewing, a geographic map indicating the location of the establishment(s) the advertisement data is associated with, and so on. According to various other exemplary embodiments, other types of advertisement data may be provided to device 10 (e.g., text, graphics, audio data, video data, etc.).

According to various exemplary embodiments, one or more of servers 48, 50, 52 may be involved in providing advertisement data to device 10. For example, in one embodiment, server 52 may be associated with an advertisement service (e.g., AdSense, provided by Google, Inc., Mountain View, Calif.) and be configured to provide advertisement data to device 10 independent from servers 48, 50. For example, as shown in FIG. 5, server 52 may communicate with device 10 and with one or more of ad sources 54, 56, 58. Ad sources 54, 56, 58 may provide advertisement data to server 52, which may in turn provide the advertisement data to mobile device 10. In one example, server 52 may provide the advertisement data based on certain criteria or data (e.g., to act as a filter to provide advertisement data having higher relevance to a user), such as a location of device 10, historical data associated with the usage of device 10 (e.g., web browsing history, location history), user-specific data (data stored in an information management application such as an email application, calendar application, contacts application, and so on), or some other criteria or data. Such criteria or data may be defined by a user and the access to such criteria or data for filtering or otherwise providing advertisement data and other content to device 10 may be limited by a user or other entity. In some embodiments, server 52 may permit various ad sources (e.g., ad sources 54, 56, 58) to register with server 52 in order to have their advertisement data provided to users (e.g., a user of device 10). Based on certain criteria or data, the advertisement data may then be selected for delivery to various devices/users.

According to other embodiments, server 52 may be configured to provide advertisement data to device 10 in conjunction with or through one or both of servers 48, 50. For example, as noted above, server 50 may be or include a server associated with an application developer that provides applications (e.g., mobile device-specific applications, such as games, financial tools, location-based mapping programs, music players, etc.) to device 10. Advertisement data may be provided to (by one or more of servers 48, 50, 52) and/or displayed on device 10 while one or more applications provided by server 50 are running on device 10. For example, one or more advertisements provided by server 52 may be displayed along a top, side, or bottom portion of display 18 while a user is running an application provided by server 50. As a result, a credit may be provided to accounts associated with server 50 (or the developer associated therewith) and/or server 52 (or the provider associated therewith) in addition to device 10, upon one or both of the delivery of the advertisement data or an input received in response to the delivery of the advertisement data.

In some embodiments, server 48 may communicate with one or both of servers 50, 52 in providing advertisement data to device 10. For example, as noted above, server 48 may be a server associated with a manufacturer of device 10. In some embodiments, server 48 may have wireless or other access to data unavailable to servers 50, 52 (e.g., user-specific data such as data from an information management application, including email, calendar, contacts, and other applications). Server 48 may provide data associated with device 10 (and the associated user) to one or both of servers 50, 52. Such data may be used, for example, to filter advertisement data being provided to device 10 to increase the relevancy of the advertisement data to the particular device/user. For example, a device manufacturer associated with server 48 may be provided with an identifier (e.g., an AdSense identification number) that is assigned to an application developer that is registered with an ad service (e.g., AdSense, provided by Google, Inc.) associated with server 52. Server 48 may then provide data to server 52 that may be utilized to filter or target advertisements to device 10, and the manufacturer may share in the revenue generated by the advertisement data (e.g., by being provided with one or more credits). As a result of providing this data, a credit may be provided to an account associated with server 48 (e.g., an account associated with the manufacturer of device 10) either upon delivery of the advertisement data or upon receiving some type of input in response to the delivery data.

It should be understood that the various embodiments discussed herein are provided for purposes of illustration only, and that more or fewer servers or other parties/entities may be involved in the provision of advertisement data to device 10. All such embodiments are deemed to be within the scope of the present disclosure.

As discussed above, in response to providing the advertisement data to device 10 (see step 62 shown in FIG. 6), one or more inputs may be received (step 64 shown in FIG. 6). The input may take a variety of forms and may be specific to mobile devices (e.g., a mobile device-specific input such as a change in location of device 10, whether a phone call was made by device 10 to a store associated with an advertisement within a predetermined time of displaying the advertisement on device 10, etc.). According to one embodiment, the input may include a user selecting a link embedded in the advertisement data. For example, the advertisement data may include a link directing a user to a website associated with a retail establishment. Upon selecting the link, the user may be directed to the website. In response to receiving the selection of the link, a credit may be generated and provided to one or more parties or accounts (e.g., an account associated with a user of device 10, an advertisement service, one or more servers, etc.).

According to another embodiment, the input may include a location, or change in location, of device 10. For example, device 10 may provide advertisement data for a retail establishment to a user of device 10. The user may then visit the retail establishment associated with the advertisement data. A server (which in some embodiments may be one of servers 48, 50, 52) or processor 40 may determine or be provided with the location of device 10 and further determine that device 10 is at or near (e.g., within a predetermined distance of) an establishment (e.g., a retail store, a restaurant, etc.) associated with the advertisement data. A credit may then be generated in response to device 10 being within the predetermined distance of the establishment. The credit may be provided to an account associated with a user of device 10, an account associated with a third party (e.g., an advertisement service or server 52), or another entity (e.g., one or both of servers 48, 50, etc.).

According to another embodiment, the input may be associated with a transaction (e.g., a purchase of goods or services using device 10), either via a network-based transaction (e.g., on-line purchases), or a face-to-face transaction where device 10 is utilized in executing the transaction (e.g., paying for retail goods at a retail establishment). For example, advertisement data may be displayed on device 10. A user may select a link embedded in or available via the advertisement data that initiates a purchase of goods, services, etc. (e.g., an on-line purchase). Alternatively, a user may travel to an establishment (e.g., a restaurant, store, etc.) and then execute a transaction using device 10. In some embodiments, device 10 may include a near field communication (NFC) device enabling the device to execute transactions via, for example, point-of-sale terminals at retailers, etc. In response to the transaction being executed, a credit may be provided to one or more entities as discussed above.

According to another embodiment, the input may include an entry in an information management application (e.g., a contact entry, a mailing list entry, a calendar appointment, etc.) running either on processor 40 or on a remote server or processor. For example, in response to receiving advertisement data on a device such as device 10, a user may create a new contact entry, a new calendar entry, or permit data to be transferred to a remote server or processor (e.g., in the case of an advertiser wanting to generate a mailing list, phone list, etc.). Furthermore, the input may include the initiation of a communication utilizing device 10 and directed toward an entity associated with the advertisement data (e.g., a retailer, restaurant, etc.). The communication may include a wireless telephone call, an email, a text message, SMS, or any other type of message initiated or attempted to be place-using device 10.

A variety of other inputs may be received in response to providing the advertisement data to device 10. According to various exemplary embodiments, the input or inputs may include or be based on inputs received via device 10 (e.g., via a keyboard, touch screen, microphone, etc.), or may be based on inputs received as a result of actions taken that involve device 10 (e.g., executing a transaction using device 10, moving device 10 to a geographic location, etc.). In some embodiments, device 10 may be configured such that a camera or other device may capture a user's expression (e.g. facial expression, etc.) upon the advertisement data being provided, thereby providing an indication of potential user excitement, enthusiasm, etc. in response to the advertisement data (in response to which a credit may be provided in some embodiments).

According to various exemplary embodiments, a variety of revenue models may be used in conjunction with device 10 in providing advertisement data to device 10, and credits may be provided to a variety of parties dependent on the revenue model utilized. For example, as discussed above, one or more credits may be provided to device 10, servers 48, 50, 52, or other entities depending on how the advertisement data or other content is provided to device 10. In some embodiments, an accounting system (e.g., application, program, code, etc.) may be provided on device 10, one of servers 48, 50, 52, or another server, processor, etc. to monitor the activity of various entities (e.g., processors, servers, etc.) and to generate, provide, and/or track the credits being provided to each entity.

Referring to FIG. 7, according to an exemplary embodiment, a multi-tier revenue generation model may be used. Each tier of the multi-tier model represents an additional input or other action taken in response to the advertisement data or previous input or action. As shown in FIG. 7, advertisement data may be provided to device 10 (step 72). An input is then received in response to the advertising data (step 74). In response to the input, a credit may be provided to one or more entities (e.g., to device 10 or to one or more of servers 48, 50, 52, etc.) (step 76). Steps 72-76 shown in FIG. 7 are substantially similar to steps 62-66 shown and discussed with respect to FIG. 6. However, the method illustrated in FIG. 7 provides for additional credits to be generated and/or provided. For example, after the credit is provided (step 76) an additional input may be received (e.g., a transaction being executed after an initial input of a selection of a link) (step 80). In response to the additional input, an (step 82) additional credit may be provided to any of the entities described herein. This process may continue as additional advertisement data is provided (return to step 78) and/or additional inputs are received (return to step 80) and, in response, further credits are provided.

In some embodiments, the monetary amount or value of the credit may be based on a variety of factors. For example, the amount of a credit may be based on the cost of goods and/or services purchased or, the credit may include a discount on goods purchased. Alternatively, the amount of the credit may be based on a pre-existing agreement such as an advertisement agreement where, for example, the purchase price of device 10 may be reduced or eliminated in exchange for a user permitting advertisement data or advertisement data of a certain type to be delivered to device 10 or in exchange for the user providing user data to one of servers 48, 50, or 52 to assist in filtering of advertisements. In such an arrangement, a user may be permitted to later "buy-out" of the agreement for a certain (e.g., predetermined) amount in order to stop or limit the advertisement data provided to device 10.

According to yet other embodiments, the amount of the credit may vary between tiers of a multi-tier revenue generation model. In such an arrangement, the amount of the credit may increase (or alternatively, decrease, stay the same, vary according to a number of factors, and so on) with each tier. For example, a user may be provided with an advertisement for a restaurant that includes a link to a web site for the restaurant. Should a user select the link, the user may be directed to the restaurant's website and the user's account may be provided with a first credit. The user may then generate a dinner reservation (e.g., in the form of a calendar entry in device 10), upon which a second (e.g., greater) credit may be provided. Further, when the user arrives at the restaurant (with device 10) an additional credit (e.g., greater than one or more preceding credits) may be generated based on the user being at the geographic location associated with the advertisement data. Further yet, should the user execute a transaction (e.g., pay for a meal) with device 10, yet another credit (e.g., greater than one or more preceding credits) may be generated. As discussed above, the amount of the credits may vary between tiers and credits may be provided to other accounts beyond accounts associated with device 10.

The use of a multi-tiered revenue generation system as that described herein may in some embodiments provide many benefits, including providing an additional incentive to users to react to advertisement data and providing sources of advertisements (e.g., restaurants, retailers, etc.) with the potential for enhanced revenues due to increased sales, etc. It should be noted that a variety of parties or entities (e.g., servers 48, 50, 52, etc.) may be included in a multi-tier revenue generation system such as that described herein, and all such features and combinations of features are deemed to be within the scope of the present application.

While the detailed drawings, specific examples and particular formulations given describe exemplary embodiments, they serve the purpose of illustration only. The hardware and software configurations shown and described may differ depending on the chosen performance characteristics and physical characteristics of the computing and other devices. The systems shown and described are not limited to the precise details and conditions disclosed. Furthermore, other substitutions, modifications, changes, and omissions may be made in the design, operating conditions, and arrangement of the exemplary embodiments without departing from the scope of the present disclosure as expressed in the appended claims.

What is claimed is:

1. A method comprising:
   providing advertisement data to a mobile device based on a first location of the mobile device;
   receiving a first input from the mobile device in response to the advertisement data, the first input based on at least one of:
   a location of the mobile device;
   a messaging communication initiated using the mobile device;
   an entry in an information management application; or
   a transaction executed using the mobile device;
   providing a first credit based on the first input;

receiving a second input from the mobile device in response to the advertisement data, the second input different from the first input and based on at least one of:
a location of the mobile device;
a messaging communication initiated using the mobile device;
an entry in an information management application; or
a transaction executed using the mobile device; and
providing a second credit based on the second input, and the first or second input is based on a second location of the mobile device,
wherein an amount of the first or second credit is based on terms of an agreement associated with providing advertisement data to the mobile device.

2. The method of claim 1, the first or second input indicative that the mobile device is within a predetermined distance of an establishment associated with the advertisement data.

3. The method of claim 2, wherein the establishment is a subject of the advertisement data.

4. The method of claim 1, wherein the transaction includes a purchase of goods associated with the advertisement data or a source of the advertisement data.

5. The method of claim 1, wherein the messaging communication is one of a wireless phone call, an email, and a text message.

6. The method of claim 5, wherein the messaging communication is sent to an establishment associated with the advertisement data.

7. The method of claim 1, wherein the entry includes contact information and the information application is a contacts application running on the mobile device.

8. The method of claim 1, wherein the entry includes a calendar appointment and the information application is a calendar application running on the mobile device.

9. The method of claim 1, the entry comprising additional advertisement data including a link to additional advertisement data, and the entry is one of a calendar appointment and a contact entry.

10. The method of claim 9, wherein the entry is an entry made in an application running remotely from the mobile device.

11. The method of claim 1, the providing the first or second credit comprising providing a credit to a user associated with the mobile device.

12. The method of claim 1, the providing the first or second credit comprising providing a discount for goods purchased using the mobile device.

13. The method of claim 1, the providing the first or second credit comprising providing a credit to at least one of an advertisement service and a manufacturer of the mobile device.

14. The method of claim 1, wherein an amount of the first or second credit is based on a monetary amount of a transaction executed using the mobile computing device.

15. A system comprising:
a mobile device; and
at least one server to provide advertisement data to the mobile device based on a first location of the mobile device, receive a first input related to the advertisement data from the mobile device, provide a first credit based on the first input, receive a second input related to the advertisement data from the mobile device, and provide a second credit based on the second input, the first or second input is based on a second location of the mobile device, and an amount of the first or second credit is based on terms of an agreement associated with providing advertisement data to the mobile device.

16. The system of claim 15, the advertisement data is displayed with data from at least one application running on the mobile device, and the first or second credit is provided to a developer of the application.

17. The system of claim 15, wherein the advertisement data is filtered based on data associated with mobile device.

18. The system of claim 17, wherein the data associated with the mobile device is provided by a manufacturer of the mobile device, and the first or second credit is provided to the manufacturer.

19. The system of claim 15, the processor to provide the first or second credit to an account for a user of the mobile device.

20. A method of providing advertisement data, comprising:
providing advertisement data to a mobile device based on a first location of the mobile device;
receiving a first input related to the advertisement data;
providing a first credit based on the first input;
receiving a second input related to the advertisement data, the second input different from the first input; and
providing a second credit based on the second input;
wherein at least one of the first input and the second input indicates a second location of the mobile computing device, and an amount of the first or second credit is based on terms of an agreement associated with providing advertisement data to the mobile device.

21. The method of claim 20, wherein an amount of the second credit is greater than an amount of the first credit.

22. The method of claim 20, wherein the first credit and the second credit are provided to an account for a user of the mobile device.

23. The method of claim 20, wherein one of the first input and the second input is based on a transaction executed using the mobile device.

24. The method of claim 20, wherein an amount of one of the first credit and the second credit is based on the monetary amount of the transaction.

* * * * *